United States Patent [19]

Katahira

[11] Patent Number: 5,327,795
[45] Date of Patent: Jul. 12, 1994

[54] BALL SCREW APPARATUS

[75] Inventor: Masayuki Katahira, Maebashi, Japan

[73] Assignee: NSK Ltd., Tokyo, Japan

[21] Appl. No.: 995,709

[22] Filed: Dec. 23, 1992

[30] Foreign Application Priority Data

Jan. 7, 1992 [JP] Japan ............................ 4-000916
Jan. 13, 1992 [JP] Japan ............................ 4-003966

[51] Int. Cl.⁵ ............................................. F16H 25/20
[52] U.S. Cl. ........................... 74/424.8 B; 74/89.15; 74/395; 318/41; 192/18 B
[58] Field of Search ............... 74/424.8 R, 424.8 B, 74/89.15, 395; 318/41; 192/18 B

[56] References Cited

U.S. PATENT DOCUMENTS

| | | | |
|---|---|---|---|
| 3,872,738 | 3/1975 | Price et al. | 74/424.8 B |
| 4,939,946 | 7/1990 | Teramachi | 74/89.15 |
| 5,127,281 | 7/1992 | Yanawgisawa | 74/89.15 |
| 5,203,222 | 4/1993 | Hirai | 74/89.15 X |

FOREIGN PATENT DOCUMENTS 61-38892 2/1986 Japan .
1-229160 9/1989 Japan .

Primary Examiner—Allan D. Herrmann
Attorney, Agent, or Firm—Shapiro and Shapiro

[57] ABSTRACT

A ball screw apparatus having a revolving position detector for detecting revolutions of a ball screw nut and a ball spline nut and a number-of-revolutions altering means for issuing a command to decrement or increment the number of revolutions of the ball screw nut so that a difference between sets of revolution numbers becomes zero. In the ball screw apparatus, a driving motor is disposed in parallel with a driving shaft. An output of the driving motor is transmitted via a belt to each nut. When driving the motor in a clutch-off/brake-on state, only the ball screw nut is driven to revolve, and the driving shaft is slid in the axial direction. When driving the motor in a clutch-on/brake-off state, the two nuts revolve together, and the driving shaft is rotationally driven. A reduction ratio on the side of the ball screw nut is set equal to that on the side of the ball spline nut, whereby the two nuts synchronously revolve.

5 Claims, 8 Drawing Sheets

BALL SCREW APPARATUS

BACKGROUND OF THE INVENTION

1. Field of the Invention

The present invention relates to a ball screw apparatus utilizable suitably for a machine tool, a scalar type robot and other industrial machineries, particular to adjustment of rotational phase shift between a ball screw nut and a ball spline nut.

2. Related Background Art

One of a large variety of known ball screw apparatuses is constructed to move and rotate a single shaft (e.g., Japanese Patent Laid-Open Application No. 61-38892). To be specific, a motor having a hollowed motor shaft is fixed to the inner surface of a housing. A single driving shaft is loosely inserted into the hollowed motor shaft. The driving shaft includes a ball screw groove formed in the rear part of the outer peripheral surface thereof and ball spline grooves formed in the front part thereof, respectively. A ball screw nut is engaged with the ball screw groove in the rear part. A ball spline nut is engaged with the ball spline groove in the front part. At the same time, each nut is revolvably supported through support bearings in the same housing. The ball screw nut is so connected to the rear end of the hollowed motor shaft as to be integrally revolvable. On the other hand, the ball spline nut is disposed opposite to the ball screw nut, with the motor being middled therebetween. A drive converting device consisting of an electromagnetic clutch and a brake is interposed between the motor and the ball spline nut. A rotor of the clutch is fixed to the front end of the hollowed motor shaft. The brake is fixed to the ball spline nut.

Electromagnetic coils of the clutch and the brake are controlled so that when one electromagnetic coil is switched on, the other is switched off. When rotating the motor in a clutch-on/brake-off state, the rotations of the hollowed motor shaft are transmitted to the ball spline nut with rotations of the rotor of the clutch. The ball spline nut revolves because of being in a brake-off state at this moment, whereby the driving shaft rotates. Contrastingly, when rotating the motor in a clutch-off/brake-on state, the rotations of the hollowed motor shaft are not transmitted to the rotor of the clutch. The revolutions of the ball spline nut are hindered by the brake. Hence, the rotations of the hollowed shaft are transmitted to only the ball screw nut, with the result that the driving shaft rectilinearly moves in the axial direction.

The driving shaft can be operated with two degrees of freedom in terms of sliding and rotating by controlling the revolutions of the ball screw nut and the ball spline nut in that manner.

The conventional actuator described above is, however, structured so that the ball screw nut, the motor, the clutch, the brake and the ball spline nut are arranged in line along the single driving shaft in the housing. A whole length of the actuator is therefore too large, and consequently there arises a problem in which the actuator is hard to handle. Additionally, it is required that the motor be demounted if the motor breaks down or when changing the specification. In this case, the following problems are caused. All the parts arranged in series have to be taken out of the housing. The respective nuts attached to the driving shaft through a multiplicity of balls also have to be detached from the driving shaft. It is not easy to replace or change the motor.

Further, in the drive converting device including the electromagnetic clutch and the brake, a slip is easy to cause due to an impact load given from outside. Subtle differences are cumulated because of the repetitive on-/off operations. There exists a high possibility to produce a revolving phase shift between the ball screw nut and the ball spline nut. If these conditions are left as they are, there is also caused a problem wherein a positional precision of the driving shaft declines.

SUMMARY OF THE INVENTION

The present invention has been devised to obviate the foregoing problems inherent in the prior arts. For this purpose, a motor and a driving shaft fitted with a ball screw nut and a ball spline nut are disposed in parallel. With this arrangement, an actuator body is not too long, and the motor can be replaced without detaching the respective nuts from the driving shaft, which lead to an easy handling. Besides, a high positional precision against an impact load and a cumulative error is secured.

The present invention takes such a structure that the driving motor is disposed in parallel with the driving shaft, and an output of the driving motor is transmitted to each nut through the belt. A length of the apparatus is reduced, and at the same time the motor can be mounted and demounted without detaching any nut from the driving shaft.

When driving the motor in a clutch-off/brake-on state, the rotation transmitting shaft is not rotated. Hence, only the ball screw nut is driven to revolve, while the ball spline nut remains in a non-revolving state. The driving shaft is thereby slid in the axial direction. On the other hand, when driving the motor in a clutch-on/brake-off state, the rotation transmitting shaft is also rotationally driven. Therefore, the two nuts are both revolved, whereby the driving shaft is driven to rotate. Herein, a reduction ratio on the side of the ball screw is set equal to a reduction ratio on the side of the ball spline nut. Hence, the two nut synchronously revolve. By the way, if the ball screw apparatus undergoes an impact load or the like from outside, slipping happens because of a torque transmitting mechanism consisting of a clutch and a brake. There is a possibility to cause a phase shift between the nuts. There is also a possibility in which subtle positional deviations are cumulated with repetitive on/off operations of the clutch and the brake. According to the present invention, however, a revolving position detector detects a phase difference in revolution between the ball screw nut and the ball spline nut. The phase shift between the nuts is thereby corrected. A high positional precision against the impact load is therefore secured.

Other objects and advantages of the present invention will become apparent during the following discussion in conjunction with the accompanying drawings.

DETAILED DESCRIPTION OF THE PREFERRED EMBODIMENTS

A first embodiment of the present invention will hereinafter be described with reference to the drawings.

Figure 1:
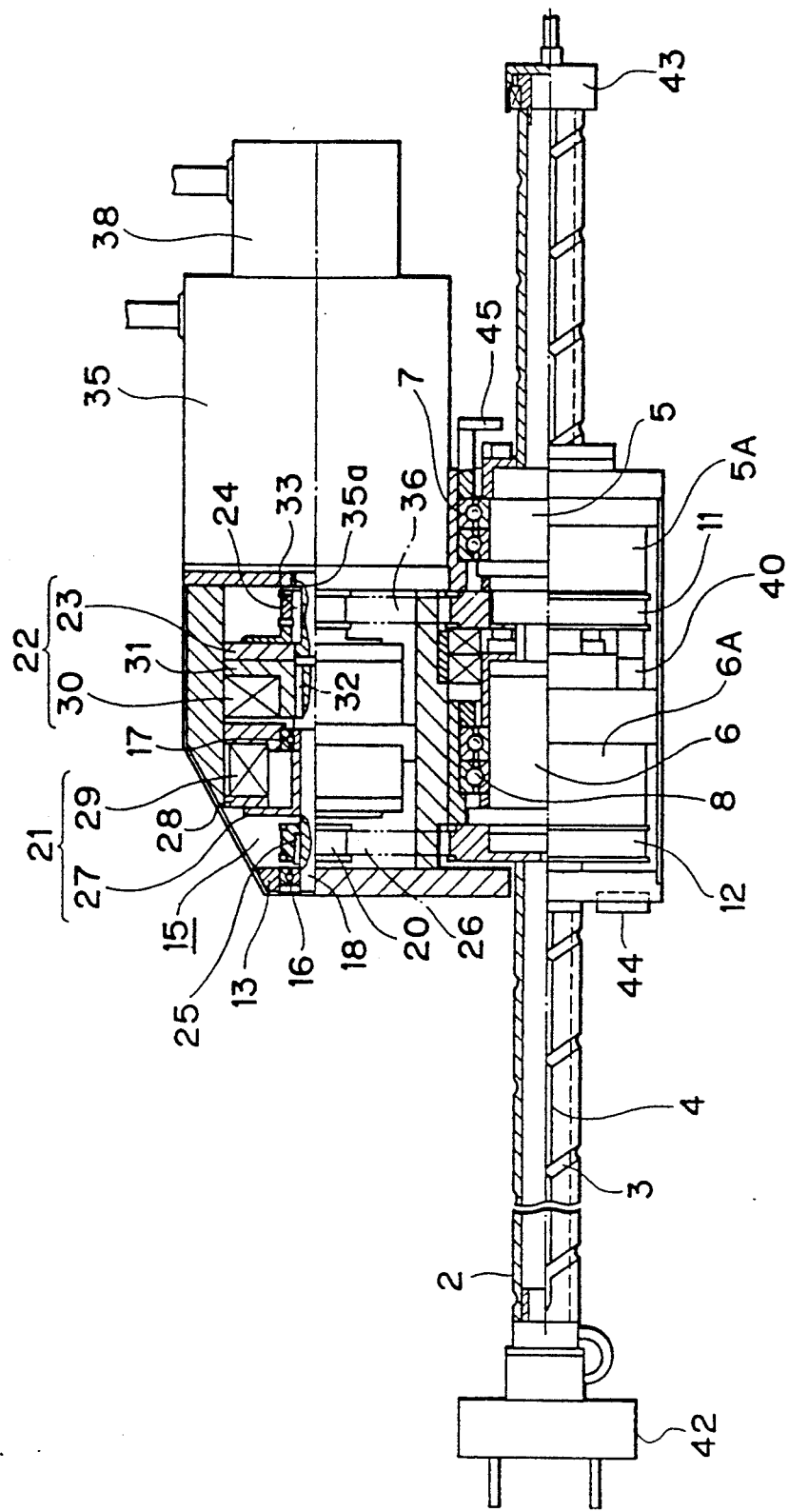
FIG. 1 is a partial cutaway front view illustrating the principal portion in a first embodiment (ball screw apparatus) of the present invention.
Figure 2:
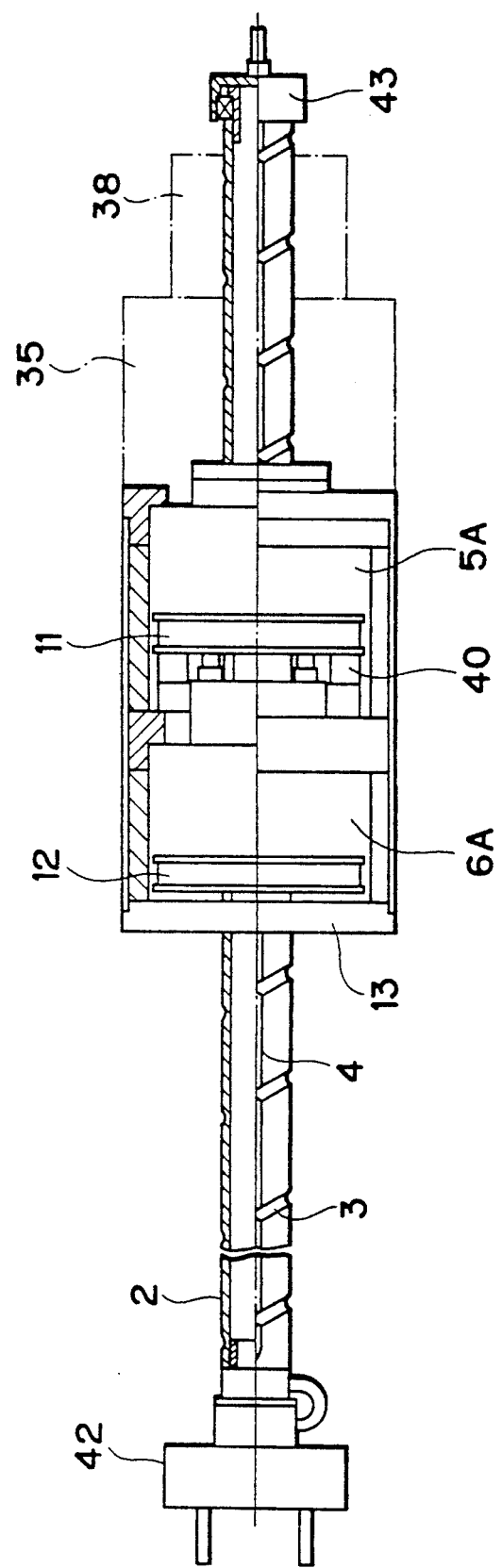
FIG. 2 is a bottom view of FIG. 1.
Figure 3:
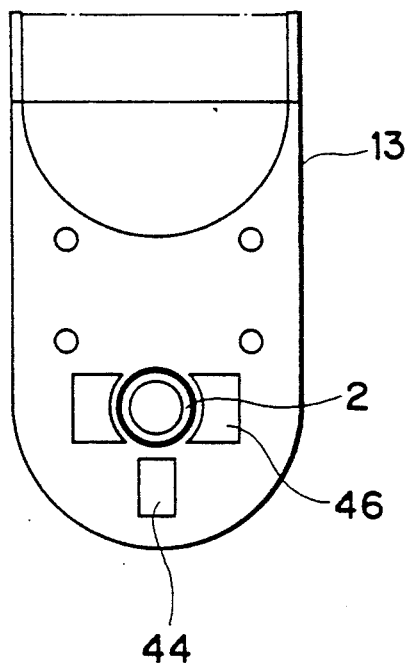
FIG. 3 is a left side view of FIG. 1.

FIGS. 1 through 3 show one embodiment of the present invention. In the Figures, a ball screw shaft 2 serves as a driving shaft. The ball screw shaft 2 includes a spiral ball screw groove 3 cut in the form of a Gothic arch groove and also ball spline grooves 4 formed rectilinearly in the axial direction over the entire length of the shaft. A ball screw nut 5 and a ball spline nut 6 are each attached to the ball screw shaft 2. An inner peripheral surface of the ball screw nut 5 is formed with a Gothic arch ball screw groove (unillustrated) corresponding to the Gothic arch ball screw groove 3. A multiplicity of balls (not shown) are rollably interposed between the ball screw groove of the nut and the ball screw groove 3 of the ball screw shaft 2. Further, the ball screw nut 5 is formed with a ball circulation path (not shown). The balls gyrate while rolling within the screw grooves with relative rotations of the ball screw shaft 2 and the ball screw nut 5. The ball screw nut 5 takes a known structure wherein the ball returns to the original position via a return path within the nut after making one and half or three and half gyrations along the screw grooves. The circulation is thus repeated. The ball screw nut 5 is revolvably supported in a housing 5A of the ball screw nut through support bearings 7.

On the other hand, a ball spline nut 6 has its inner peripheral surface formed with ball spline grooves (not shown) corresponding to the ball spline grooves 4 extending rectilinearly along the ball screw shaft 2. A multiplicity of balls (unillustrated) are rollably interposed between the ball spline grooves of this nut and the ball spline grooves 4 of the ball screw shaft 2. Further, the ball spline nut 6 is structured in the following manner. A ball circulation path (not illustrated) is formed in the ball spline nut 6. The balls move in the rectilinear direction while rolling within the grooves with relative rectilinear movements of the ball screw shaft 2 and the ball spline nut 6. The ball reaches a nut end and enters a return path within the nut. The ball then makes a U-turn and returns to the original position. The circulation is thus repeated. The ball spline nut 6 is revolvably supported in a ball spline nut housing 6A through support bearings 8.

A pulley 11 is attached to the front end (left end in FIG. 1 ) of the ball screw nut 5 protrusively from the housing 5A. Similarly, a pulley 12 is attached to the front end of the ball spline nut 6 protrusively from the housing 6A. A lower section of a common casing 13 encases the ball screw nut housing 5A, the pulley 11, the ball spline nut housing 6a and the pulley 12. A drive switching mechanism 15 is disposed in a space of an upper section of the casing 13.

The drive switching mechanism 15 includes a rotation transmitting shaft 18 rotatably supported in the casing 13 through bearings 16, 17 and disposed in parallel with the ball screw shaft 2. The drive switching mechanism 15 also includes one pulley 20 attached to this rotation transmitting shaft 18, an electromagnetic brake (hereafter referred to as "brake") 21, an electromagnetic clutch (hereafter called "clutch") 22 and the other pulley 24 so joined to a rotor 23 of the clutch 22 as to be integrally rotatable. The above-mentioned one pulley 20 is fixed to the rotation transmitting shaft 18 via a key 25. The pulley 20 is connected via a timing belt 26 to the pulley 12 attached to the ball spline nut 6. A brake ring 27 of the brake 21 is fixedly fitted to the rotation transmitting shaft 18. Mounted in the casing 13 are a brake member 28 connectable to and disconnectable from the brake ring 27 and a brake coil 29 for driving the braking member 28. Besides, a clutch drive plate 31 driven by a clutch coil 30 is integrally revolvably attached to the rotation transmitting shaft 18 through a key 32. On the other hand, the rotor 23 of the clutch 22 is, as described above, integrally joined to the other pulley 24. The pulley 24 is fixed to an output shaft 35a of a driving motor 35 with a key 33. The pulley 24 is connected via a timing belt 36 to the pulley 11 attached to the ball screw nut 5.

The driving motor 35 is a servo motor detachably attached to the outer part of the casing 13 through a mounting means such as a bolt, etc.. The motor 35 is feedback-controlled by a semi-closed loop upon detecting a position and a speed of the motor shaft thereof by means of a detector 38.

The brake 21 and the clutch 22 of the drive switching mechanism 15 are controlled in such a way that when one is switched on, the other is switched off. More specifically, if the rotor 23 of the clutch 22 is connected to the clutch drive plate 31, the brake ring 27 of the brake 21 is disconnected from the brake member 28. Whereas if the rotor 23 of the clutch 22 is disconnected from the clutch drive plate 31, the brake ring 27 of the brake 21 is connected to the brake member 28. Energizing the brake coil 29 and the clutch coil 30 with electricity is thus controlled.

Further, a revolving position detector 40 for detecting a revolving phase difference between the two nuts 5 and 6 is mounted on any one end surface of the ball screw nut 5 and the ball spline nut 6 (or may be mounted on the end surface of the pulley fixed to each nut). This detector 40 is provided for the following purpose. Namely, torque of the motor 35 is transmitted via the clutch/brake system drive switching mechanism 15 to the ball screw nut 5 and the ball spline nut 6 as well. Because of the construction for this purpose, when an impact load or the like is applied from outside, the slip takes place on the connecting surface between the brake 21 and the clutch 22. There is a possibility in which a phase shift between the respective nuts 5 and 6 is caused.

In this case, the revolving position detector 40 detects a phase shift with respect to a command value of the ball spline nut 6 to which the rotation is transmitted via the clutch 22. Energizing the brake coil 29 and the clutch coil 30 with electricity is controlled based on the detected information thereof, thus effecting a correction. The revolving position detector 40 involves the use of, e.g., an optical system revolving encoder. In this case, both an increment type and an absolute type encoders are available. The increment type encoder is, however, capable of detecting only a variation of angle. Hence, if the power supply is cut off due to a service interruption, the absolute position can not be known. This requires the use of another sensor to locate a mark for detection of the mechanical absolute position after the power supply is again switched on. The absolute type optical system revolving encoder capable of detecting the absolute position is therefore preferable.

Note that a robot hand 42 is attached to the top end of the illustrated ball screw shaft 2, and a rotary joint 43 is fitted to the rear end thereof. Mounted further on the lower part of the front surface of the casing 13 is a limiter 44 for controlling a retreat limit of the ball screw shaft 2 by detecting the robot hand 42. A limiter 45 for controlling a progress limit of the ball screw shaft 2 by detecting the rotary joint 43 is also mounted on the rear surface of the casing 13. The numeral 46 designates a mechanical stopper.

The operation of this embodiment will next be explained.

In an actuator, for instance, the casing 13 is fixedly mounted on a mounting unit (unillustrated) of a machine tool or a robot. The motor 35 is driven in a clutch-off state where the rotor 23 of the clutch 22 is disconnected from the clutch drive plate 31 and in a brake-on state where the brake member 28 is pressed on the brake ring 27 of the brake 21. Hereupon, the pulley 24 connected directly to the motor output shaft 35a rotates. The rotations are transmitted via the timing belt 36 to the pulley 11, whereby the ball screw nut 5 is driven to revolve. On the other hand, the rotation transmitting shaft 18 is disconnected from the motor output shaft 35a upon switching off the clutch 22 and is therefore in a free rotation mode. The shaft 18 can not, however, be rotated because of a restriction by the brake 21. This braking force is transmitted to the ball spline nut 6 connected via the pulley 20 fixed to the rotation transmitting shaft 18, the timing belt 26 and the pulley 12, thereby hindering the rotations thereof. The ball spline nut 6 is thus in an unrotational state, and only the ball screw nut is driven to revolve. Then, the ball screw shaft 2 is slid in the axial direction while being guided by the balls of the ball spline nut 6 that are set in the ball spline grooves 4. The ball screw shaft 2 moves back and forth in accordance with the rotating direction of the motor 35.

Contrastingly, the motor is driven in the clutch-on state where the rotor 23 of the clutch 22 is connected to the clutch drive plate 31 and in the brake-off state where the brake member 28 is disconnected from the brake ring 27 of the brake 21. Hereupon, the pulley 24 connected directly to the motor output shaft 35a rotates. The rotation is transmitted via the timing belt 36 to the pulley 11, whereby the ball screw nut 5 is driven to revolve. Further, the rotation transmitting shaft 18 is connected to the motor output shaft 35a upon switching on the clutch 22 and comes into an integral rotation mode. Besides, because of being unrestricted by the brake 21, the rotations of the motor output shaft 35a are transmitted to the ball spline nut 6 connected via the rotation transmitting shaft 18, the pulley 20 fixed to the rotation transmitting shaft 18, the timing belt 26 and the pulley 12. A reduction ratio of a set of the pulleys 24, 11 on the side of the ball screw nut 5 is set equal to a reduction ratio of a set of the pulleys 20, 12 on the side of the ball spline nut 6. Hence, the two nuts 5, 6 precisely synchronously revolve. When the two nuts 5, 6 revolve together in this way, the ball screw shaft 2 is rotationally driven forwards and reversely in accordance with the revolving direction of the ball spline nut 6.

If the impact load is applied from outside, and when the slip is caused on the connecting surface between the brake 21 and the clutch 22, there exists a possibility in which a revolving phase shift is produced between the ball screw nut 5 and the ball spline nut 6. In this case, the revolving position detector 40 detects the phase shift with respect to the command value of the ball spline nut 6. The actions of the brake 21 and the clutch 22 are controlled based on a detection signal thereof. The phase difference with respect to the command value of the ball spline nut 6 is thus corrected. An error in positional precision of the ball screw shaft 2 due to an accumulation of the phase differences is thereby prevented. An accuracy of the actuator is consequently secured.

In accordance with the embodiment discussed above, the motor 35 can be easily demounted by removing the mounting bolt from the casing 13. There is no necessity at all to take the trouble to remove the ball screw nut 5 and the ball spline nut 6 out of the ball screw shaft 2. Therefore, the motor can be readily and quickly changed in the event of modifying the specification and causing a breakdown. Besides, the actuator body is further reduced in length, made compact, small in weight and easy to handle as compared with the conventional ball screw apparatus in which the respective constructive parts are attached in series to the ball screw shaft 2.

Moreover, it is possible to secure a high precision by compensating an influence by the impact load, etc..

Figure 4:
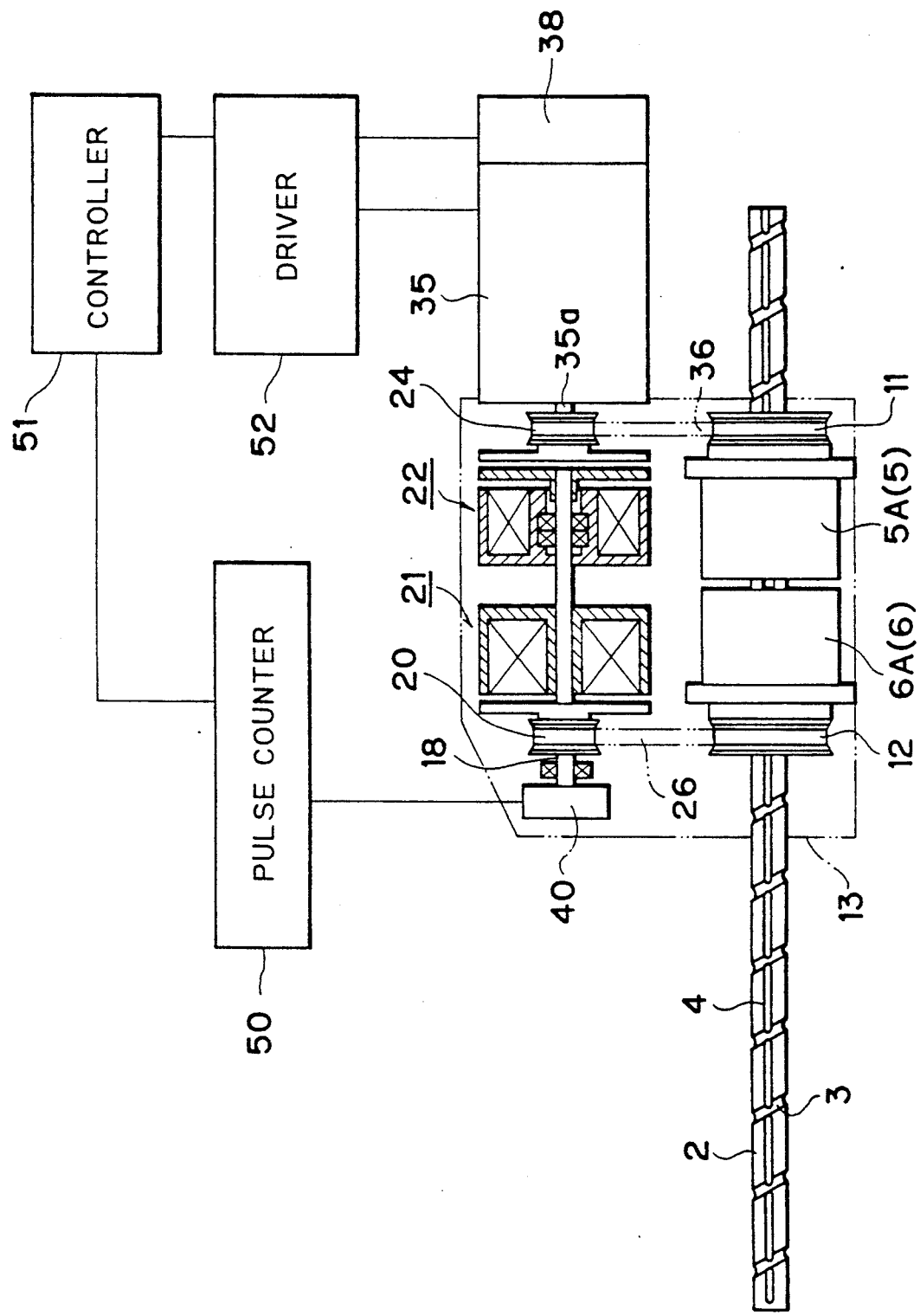
FIG. 4 is a partial cutaway front view illustrating the principal portion in a second embodiment of the present invention.

FIG. 4 shows a second embodiment.

In accordance with this embodiment, the revolving encoder 40 serving as the revolving detector is attached to the top end of the rotation transmitting shaft 18. In this case, the rotations of the rotation transmitting shaft 18 are detected by the revolving detector 40, thereby indirectly detecting the number of revolutions of the ball spline nut 6. A detected value thereof is sent via a pulse counter 50 to a controller 51 and compared with a preset command value therein. A signal corresponding to the result thereof is transmitted to a driver 52. A phase difference with respect to the command value of the ball spline nut 6 is thus corrected.

Other constructions, operations and effects are not different from those in the embodiment discussed above.

As described above, the ball screw apparatus in the first group of embodiments of this invention are structured as below. The driving power source including the driving motor, the clutch and the brake are disposed in parallel with the driving shaft. The motor output is transmitted via the belt to the ball screw nut fitted to the driving shaft and the ball spline nut as well. With this structure, there are advantages wherein the driving motor can be easily attached and detached without removing the nuts thereof from the driving shaft; and the maintenance is simplified.

Further, advantage that the length of the actuator body is decreased, and the weight is also reduced to facilitate handling of the actuator.

An additional advantage is that the ball screw apparatus exhibiting a high precision of impact load resistant property although the actuator has two degrees of freedom in terms of sliding and rotating.

As mentioned above, in each embodiment, even if the phase difference is generated between the ball screw nut 5 and ball spline nut 6 due to impact from the outside, shift of the nut 6 from command value is corrected by controlling the brake 21 and clutch 22. In this way, the phase difference between both nuts 5 and 6 is corrected for purposes of further operation.

Figure 8:
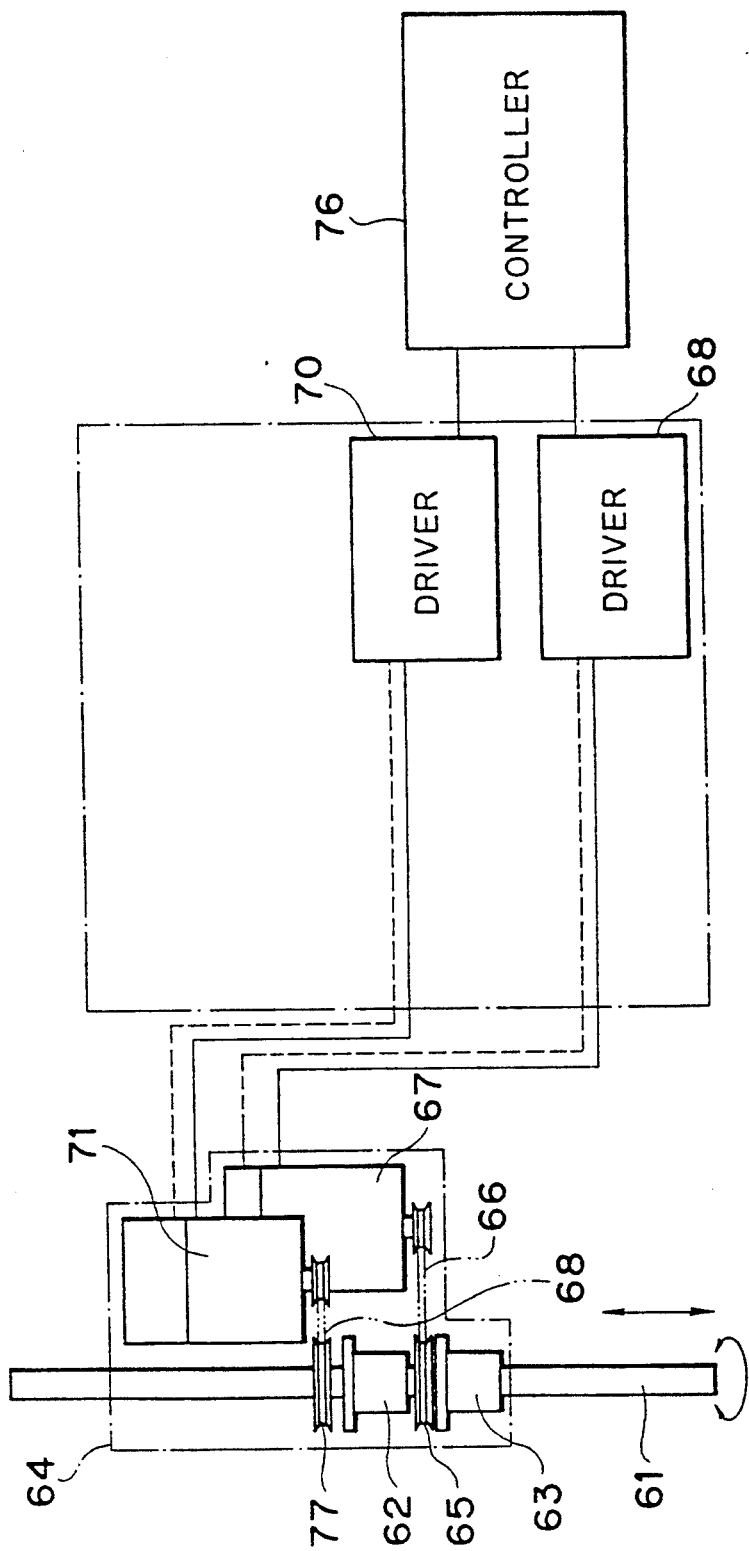
FIG. 8 is a schematic block diagram illustrating a ball screw apparatus in the prior art.

By the way, there is another type ball screw apparatus in which the phase difference between the ball screw nut and the ball spline nut is corrected during the operation (for example, refer to Japanese Patent Laid-Open Application No. 1-229160), the following construction is given. As illustrated in FIG. 8, a ball screw shaft 1 includes a ball screw groove and ball spline grooves that are configured with overlaps in the outer peripheral surface of a single shaft body. A ball screw nut 62 and a ball spline nut 63 are fitted thereto through a multiplicity of balls. Further, the two nuts 62, 63 are each revolvably mounted in a housing 64 through support bearings. Pulleys 65, 77 are attached respectively to the ball screw nut 62 and the ball spline nut 63.

The pulleys 65, 77 are connected via timing belts 66, 78 respectively to driving devices 67, 71 each constructed of a motor or the like. The two nuts 62, 63 are each driven to revolve by the two driving devices 67, 71. The two driving devices 67, 71 are connected via drivers 68, 70 to a controller 76. The two nuts 62, 63 are driven to revolve individually with a predetermined number of revolutions under independent control by separate commands issued from the controller 76.

Driving means of the nuts 62, 63 are herein composed of the pulleys 65, 77, the timing belts 66, 78, the driving devices 67, 71 and the drivers 68, 70.

In the above-mentioned ball screw, for example, a housing 64 is fixedly mounted on a mounting unit of a machine tool or a scalar type robot. Based on the commands from the controller 76, the driving devices 67, 71 rotate the pulleys 65, 77 through the timing belts 66, 78. The ball screw shaft 61 is thereby driven. When revolving only the ball screw nut 62, the ball screw shaft 61 moves in the axial direction. Further, when revolving only the ball spline nut 63, the ball screw shaft 61 moves in the axial direction with rotary motions.

Besides, if the control is conducted to cause only the rotary motions of the ball screw shaft 61 without the movement in the axial direction, it is required that the ball screw nut 62 and the ball spline nut 63 be revolved together in the same direction with the same number of revolutions. Under this control, however, the number of revolutions of the ball screw nut 62 has hitherto been synchronized by an open loop control command from the controller 76 to coincide with the number of revolutions of the ball spline nut 63.

Note that the two driving means normally incorporate reduction mechanisms consisting of, as explained before, the pulleys 5, 17 and the timing belts 6, 18. A reduction ratio is set large on the side of the ball spline nut 3 because a low velocity and high torque are requested. The reduction ratio is set small on the side of the ball screw nut 2 because a property of high velocity is considered important.

In the above-described ball screw apparatus, however, the reduction ratios of the two driving means are different as explained above. At the same time, the specifications of the motors for driving the nuts 62, 63 are not necessarily identical. Hence, there is a difference in revolving resolution between the two nuts 62 and 63. The number of revolutions of the ball screw nut 62 is synchronized under the open loop control. It is therefore difficult to completely synchronize the numbers of revolutions of the two nuts 62, 63. Furthermore, the numbers of revolutions of the two nuts 62, 73 are independently controlled. This results in intricacy of the operability.

A second group of embodiments of the present invention have been made in view of the foregoing points. The second embodiment is intended to make possible the complete synchronization of the numbers of revolutions of the two nuts with a simple operation and facilitate the control over the rotary motion and movement of the ball screw shaft.

In accordance with this embodiment, the ball screw shaft is moved (rectilinearly) in the axial direction by driving only the ball screw nut to revolve while the ball spline nut remains halted. More specifically, the controller issues a driving command to only the ball screw nut driving means to revolve the nut with a predetermined number of revolutions. The ball screw nut is driven to revolve by the ball screw nut driving means, thereby moving the ball screw shaft in the axial direction. At this moment, the ball spline nut is kept in a hold state.

Further, when causing the ball screw shaft to make rotary motions without being moved in the axial direction, the controller gives the driving command to only the ball spline nut driving means. The driving device thereof drives the ball spline nut to revolve. Hereupon, number-of-revolutions detecting means respectively detect the number of revolutions of the ball spline nut and that of the ball screw nut. Signals corresponding to the numbers of revolutions are transmitted to number-of-revolutions altering means.

The number-of-revolutions altering means calculate a deviation defined as a difference between two sets of revolution numbers, with the number of revolutions of the ball spline nut serving as a target value of two sets of revolution numbers thus detected. The number-of-revolutions altering means issues a command to increment or decrement the number of revolutions of the ball screw nut that is set in the ball screw nut driving device in accordance with a difference therebetween. To be specific, if the number of revolutions of the ball screw nut is smaller than that of the ball spline nut, the altering means gives the command to increment the number of revolutions of the ball screw nut that is set in the ball screw nut driving means. Whereas if the number of revolutions of the ball screw nut is larger than that of the ball spline nut, the altering means issues the command to decrement the number of revolutions of the ball screw nut that is set in the ball screw nut driving device. With this action, the ball screw nut revolves following up the revolving drive of the ball spline nut in synchronization therewith.

The feedback control described above is carried out till the numbers of revolutions of the two nuts coincide with each other. The ball screw shaft is controlled with a high precision to make only the rotary motions without moving in the axial direction.

The second group of embodiments of the present invention will be described in conjunction with the drawings.

Figure 5:
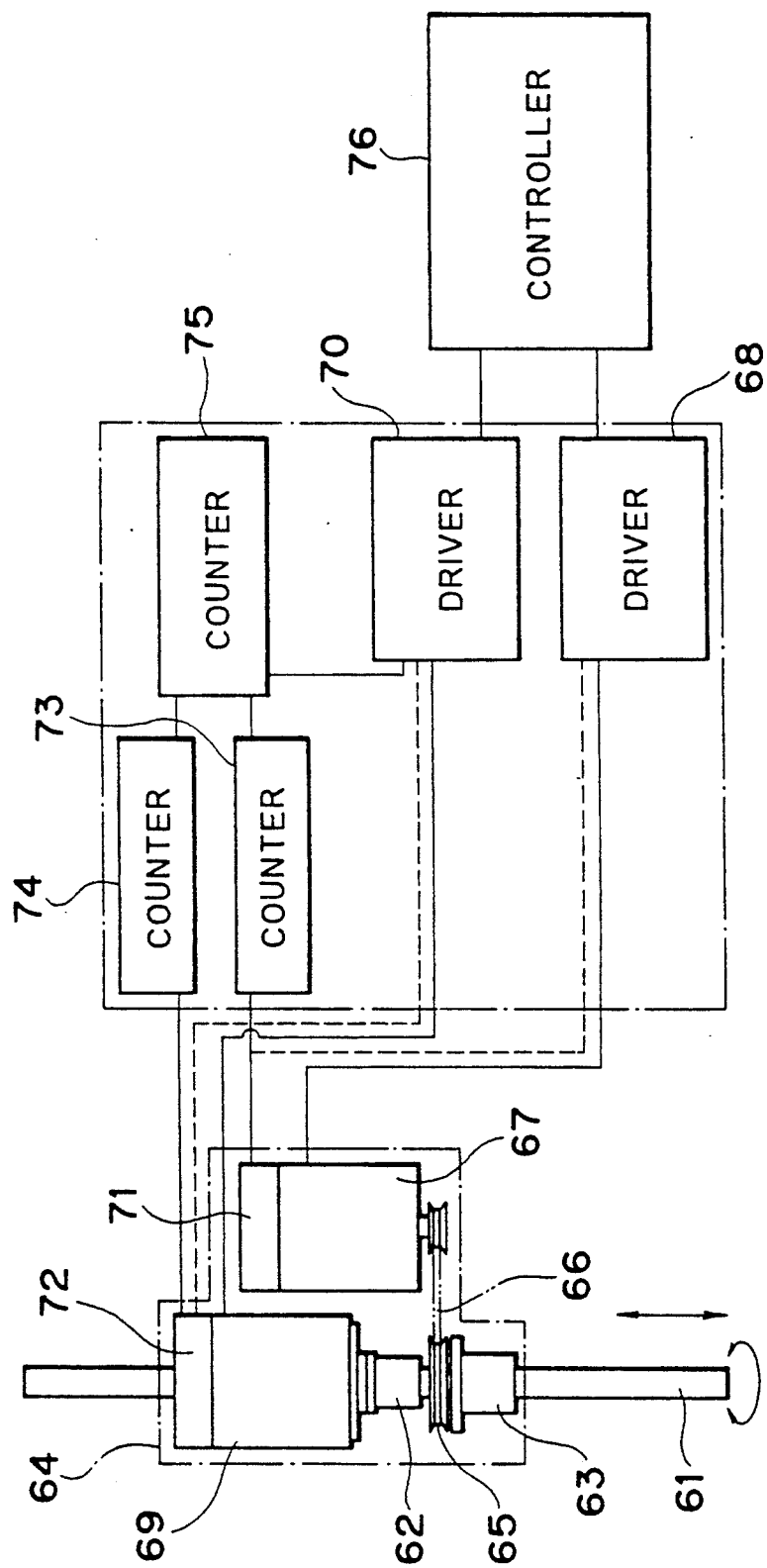
FIG. 5 is a schematic block diagram showing a ball screw apparatus in a third embodiment of the present invention.

A ball screw apparatus and a driving control unit are constructed as illustrated in FIG. 5. In the Figure, a ball screw shaft 61 includes a spiral ball screw groove formed in the outer peripheral surface thereof and also a plurality of ball spline grooves (both unillustrated) formed in the axial direction. A ball screw nut 62 and a ball spline nut 63 are attached through the two types of grooves to the ball screw shaft 61.

The inner peripheral surface of the ball screw nut 62 is formed with a ball screw groove corresponding to the ball screw groove cut in the ball screw shaft 61. A multiplicity of balls are rollably interposed between the two ball screw grooves facing to each other. The ball screw nut 62 also has a circulation path for the balls. The balls gyrate while rolling within the screw grooves with relative rotations of the ball screw shaft 61 and the ball screw nut 62. The ball screw nut 62 adopts such a known structure that the ball, after making one and half or three and half gyrations, returns to the original position via a return path within the nut, and the circulation is thus repeated. The ball screw shaft 61 moves in the axial direction with revolutions of the ball screw nut 62. Note that a bearing inner ring groove is cut in the outer peripheral surface of the ball screw nut 62.

On the other hand, the ball spline nut 63 takes the following known structure. The inner peripheral surface of the ball spline nut 63 is formed with ball spline grooves corresponding to the ball spline grooves rectilinearly extending along the ball screw shaft 61. The multiplicity of balls are rollably interposed between the ball spline grooves of the nut 63 and the confronting ball spline grooves of the ball screw shaft 61. A circulation path for the ball is also formed therein. The ball moves in the rectilinear direction while rolling within the screw grooves with the relative rectilinear movements of the ball screw shaft 61 and the ball spline nut 63. The ball reaches the end of the nut 63 and enters a return path in the nut 63. The ball then makes a U-turn and returns to the original position. The circulation is thus repeated. The ball screw shaft 61 moves in the axial direction with the revolving motions of the ball spline nut 63. Note that a bearing inner ring groove is cut in the outer peripheral surface of the ball spline nut 63.

A common housing 64 is, as explained above, covered along the outer peripheries of the ball screw nut 62 screwed to the ball screw shaft 61 and of the ball spline nut 63 screwed thereto. In this housing 4, bearing outer ring grooves corresponding to the bearing inner ring grooves of the ball screw nut 62 and of the ball spline nut 63 are formed in the inner peripheral surfaces thereof. A multiplicity of bearing balls are installed in groove spaces shaped by the bearing outer ring grooves and the confronting bearing inner ring grooves. The two nuts 62, 63 are thus revolvably held.

Further, a pulley 65 is coaxially attached to the ball spline nut 63. This pulley 65 is connected to a spline nut driving motor 67 fixed to the housing 64 through a precise power transmission timing belt 66. The pulley 65 is rotationally driven by the spline driving motor 67. The spline nut drive motor 67 is connected to a spline nut driver 68. The number of revolutions of the motor 67 is controlled by a drive current supplied from the driver 68. Note that a reduction ratio of a reduction mechanism constructed of the pulley 65 and the timing belt 66 is set to 1/n.

Further, a ball screw nut driving motor 69 is so fixed in the housing 64 as to be coaxial with the ball screw shaft 61. A rotary shaft of the ball screw nut driving motor 69 is connected to the ball screw nut 62. The ball screw nut 62 is thereby driven to revolve. The ball screw nut driving motor 69 is connected to a ball screw nut driver 70. The number of revolutions of the motor 69 is controlled by a drive current supplied from the driver 70.

Besides, the two motors 67, 69 are each provided with encoders 71, 72 for converting angular displacements into digital signals. The respective encoders 71, 72 are connected to pulse counters 73, 74 and also to drivers 68, 70 corresponding thereto. The encoders 71, 72 transmit pulses defined as detected digital signals to the pulse counters 73, 74 and the drivers 68, 70. The encoders 71, 72 and the pulse counters 73, 74 are combined to constitute a number-of-revolutions detecting means for each nut. The detecting means detects the number of pulses corresponding to the number of revolutions of each of two nuts 62, 63. Herein, the spline nut encoder 71 does not directly detect the number of pulses corresponding to the number of revolutions of the ball spline nut 63. Therefore, the ball screw nut pulse counter 74 effects an arithmetic to multiply the number of pulses to be outputted per predetermined time by n, corresponding to 1/n, i.e., a ratio of the number of revolutions of the ball spline nut 63 to that of the spline nut driving motor 67.

Note that the pulses transmitted from the encoders 71, 72 to the drivers 68, 70 are employed for a servo mechanism of the closed loop control over the numbers of revolutions of the corresponding driving motors 67, 69.

Further, the two pulse counters 73, 74 are connected to a difference counter 75 constituting a number-of-revolutions altering means. This difference counter 75 obtains a difference between values inputted from the two pulse counters 73, 74. Namely, the difference counter 75 subtracts the number of pulses that is inputted from the ball screw nut pulse counter 74 from the number of pulses that is inputted from the spline nut pulse counter 73. The counter 75 thus obtains a difference between the number of pulses that corresponds to the number of revolutions of the ball screw nut 62 and the number of pulses that corresponds to the number of revolutions as a target value of the ball spline nut 63. A signal corresponding to the value thereof is supplied to ball screw nut driver 70.

Based on the inputted value, the ball screw nut driver 70 increments—if the inputted value is a positive value, i.e, if the number of revolutions of the ball screw nut 69 is smaller than that of the ball spline nut 63—the number of revolutions by increasing the drive current set and supplied to the ball screw nut driving motor 72. Whereas if the inputted value is a negative value, viz., if the number of revolutions of the ball screw nut 69 is larger than that of the ball spline nut 63, the number of revolutions is decremented by decreasing the drive current.

In this way, the servo mechanism of the closed loop control for synchronizing sets of revolution numbers of the two nuts is constructed of the encoders 71, 72, the pulse counters 73, 74, the difference counter and the ball screw nut driver 70. The two drivers 68, 70 connected to the controller 76 are controlled by respective commands issued from the controller 76.

In the above-described ball screw driving control unit, when moving the ball screw shaft 61 in the axial direction, i.e., when causing the rectilinear movement thereof, the controller 76 transmits a driving command to only the ball screw nut driver 70. Hereupon, a predetermined driving current flows to the ball screw nut driving motor 69 in conformity with the command from the ball screw nut driver 70. The ball screw nut 62 is thereby driven to revolve at a predetermined speed. The revolutions of the ball screw nut 62 are transmitted via the ball screw groove to the ball screw shaft 61. The ball screw shaft 61 then moves in the axial direction at a velocity corresponding to the revolving speed of the ball screw nut. At this time, the spline nut 63 assumes a hold state in accordance with a command from the controller 76.

Further, when making the rotary motions of the ball screw shaft 61, the controller 76 issues a driving command to only the spline nut driver 68. Then, a predetermined driving current is supplied to the spline nut driving motor 67 in conformity with a command from the spline nut driver 68. The ball spline nut 63 is driven to revolve with a predetermined number of revolutions while being decelerated at the ratio of 1/n of the number of revolutions by the reduction mechanism consisting of the timing belt 66 and the pulley 65.

At this moment, the numbers of pulses that correspond to the numbers of revolutions of the two motors 67, 69 are sent to the pulse counters 73, 74 via the encoders 71, 72 attached to the two motors 67, 69. The values thereof are supplied to the difference counter 75 which in turn computes a difference between two sets of pulse numbers of the counters. The thus computed value is supplied from the difference counter 75 to the ball screw nut driver 70. The ball screw nut driver 70 increments, if the supplied value is a positive value, the number of revolutions of the ball screw nut 62 by increasing a set driving current to the ball screw nut driving motor 69. Whereas if the supplied value is a negative value, the driver 70 decrements the number of revolutions of the ball screw nut 62 by decreasing the set driving current to the ball screw nut driving motor 69 (feedback control). The dynamic control is executed so that the number of revolutions of the ball screw nut 62 coincides with that of the ball spline nut 63. Namely, the ball screw nut 62 revolves with the same number of revolutions while following up the drive of the ball spline nut 63.

As described above, in accordance with this embodiment, the command corresponding to the rotary motions is imparted to only the ball spline nut 63 when causing the rotary motions of the ball screw shaft 61. Under such simple control, the numbers of the revolutions of the two nuts 62, 63 are synchronized. For this reason, there is no necessity for taking the synchronism by giving different commands to the two nuts 62, 63 as in the prior art. The control is thus simplified. Further, when altering the number of rotations in the rotary motions of the ball screw shaft 61, the number of revolutions of the ball screw nut 62 can be synchronized with that of the ball spline nut 63 under the feedback control simply by issuing a command to alter the number of revolutions of the ball spline nut 63. As described above, in the ball screw apparatus in accordance with this embodiment, only the ball spline nut 63 may be driven when rotating the ball screw shaft 61. When rectilinearly moving the ball screw shaft, only the ball screw nut 62 may be driven. The operability is therefore improved to facilitate interlocking with outside devices as in the case of sequence control and so on.

Incidentally, in this embodiment, the ball screw nut pulse counter 74 multiplies the counter number by n corresponding to the reduction ratio of 1/n. The set driving current from the ball screw nut driver 70 is increased or decreased depending on the positive or negative of the arithmetic result by the difference counter 75. The set driving current may be, however, controlled to increment (or decrement in the case of a negative value) the set number of revolutions (the number of pulses from the encoder 12) by a value of the arithmetic result in the difference counter 75. This involves multiplying the counter value by (1/n) in the spline nut pulse counter 73.

Next, a fourth embodiment will be demonstrated.

Figure 6:
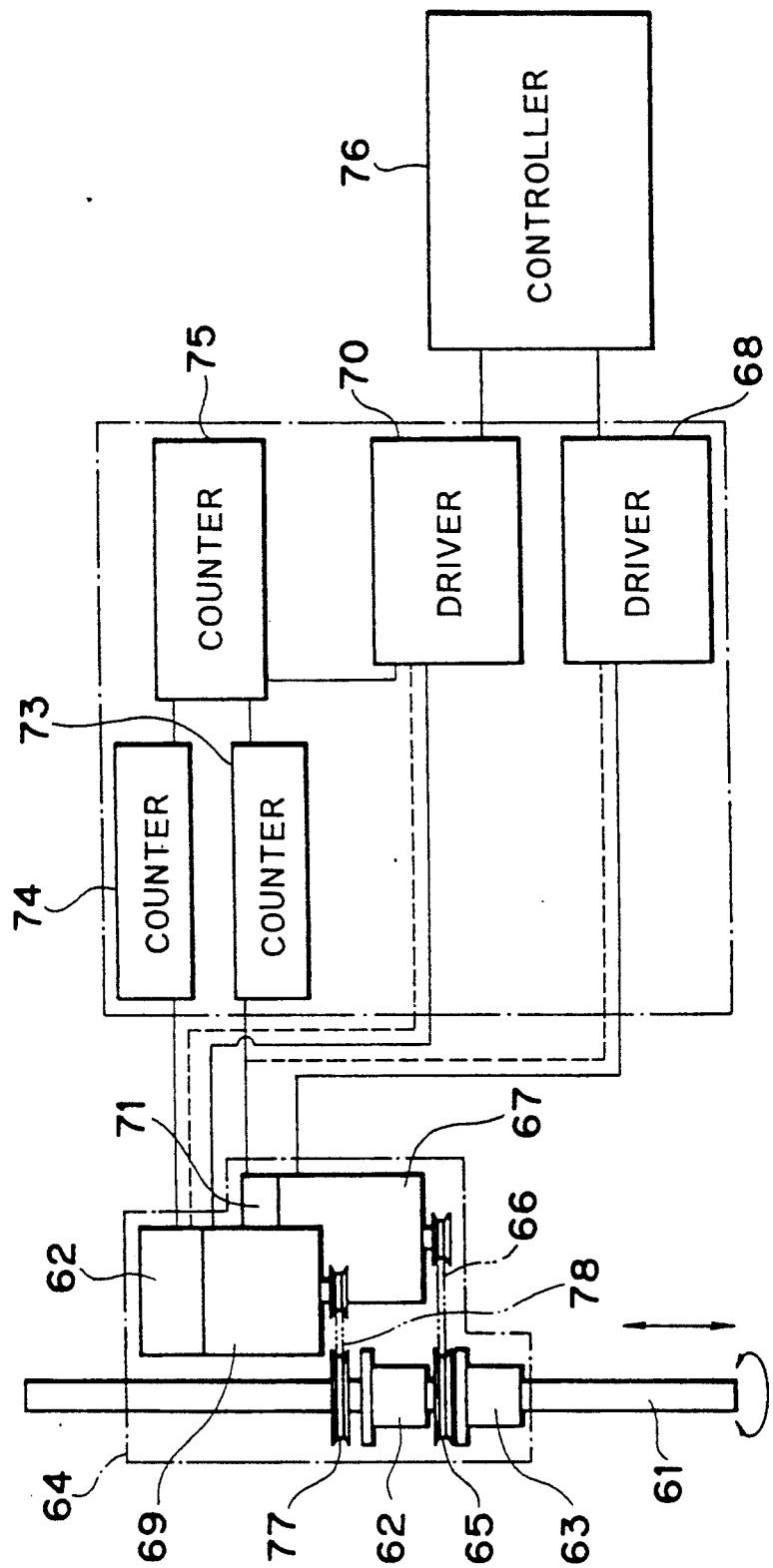
FIG. 6 is a schematic block diagram illustrating the ball screw apparatus in a fourth embodiment of the present invention.

FIG. 6 illustrates a construction of the fourth embodiment. A pulley 17 is attached to one end of the ball screw nut 62. The pulley 67 is connected via a timing belt 68 to a ball screw nut driving motor 72. The pulley 67 and the timing belt 78 cooperate to constitute a reduction mechanism, wherein a reduction ratio is set to 1/m. The ball screw nut pulse counter 74 performs an arithmetic to multiply the number of pulses inputted from the encoder 72 by (n/m). Other constructions are the same as those in the first embodiment.

In the thus constructed ball screw apparatus also, the ball screw nut 2 is connected via the reduction mechanism to the driving motor 9. An arithmetic corresponding to a reduction ratio is effected in the ball screw pulse counter 14. In others, the same operation and effect as those in the third embodiment are exhibited.

A fifth embodiment will next be explained.

Figure 7:
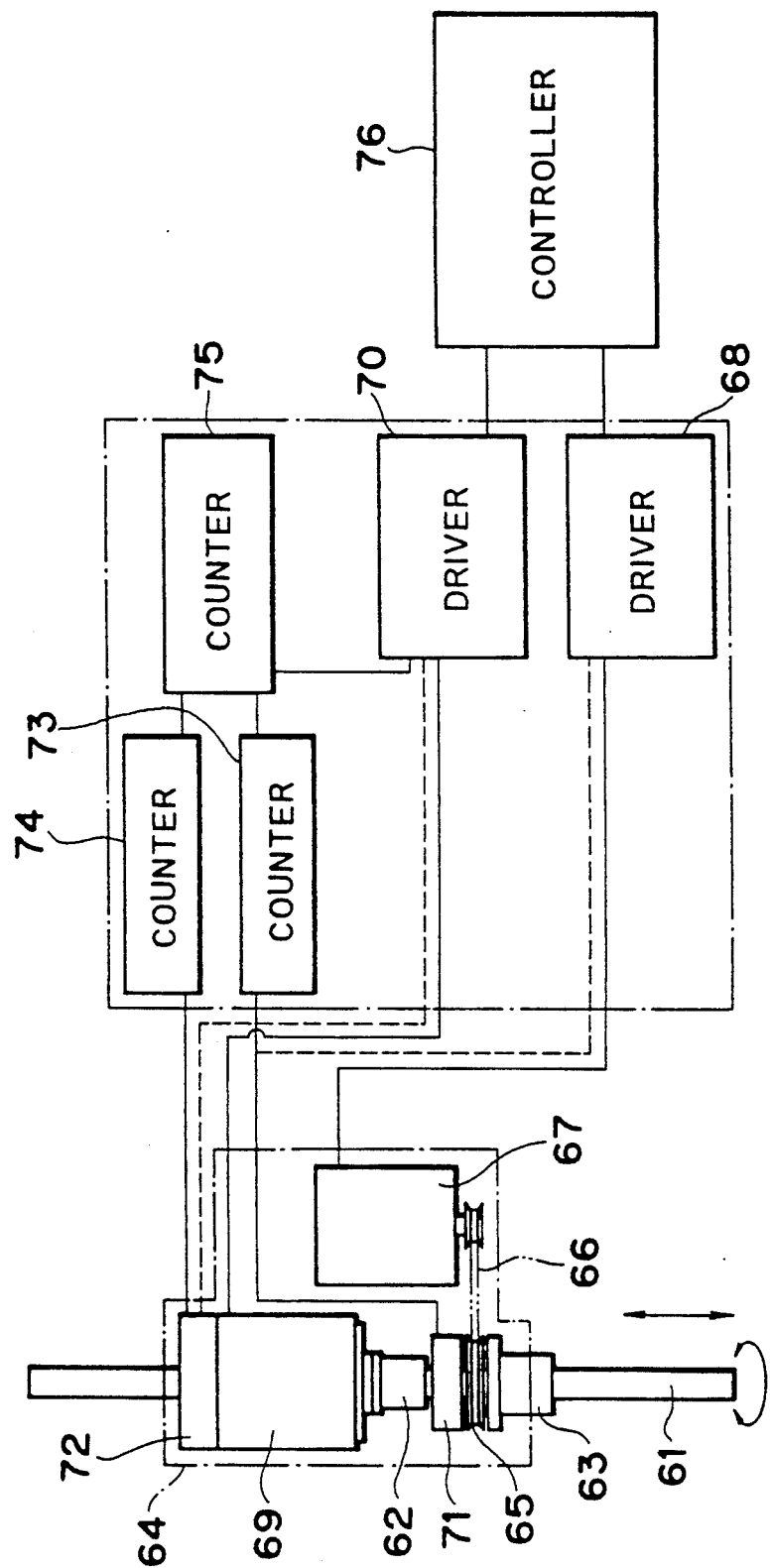
FIG. 7 is a schematic block diagram illustrating the ball screw apparatus in a fifth embodiment of the present invention.

FIG. 7 illustrates a construction of the fifth embodiment. The spline nut encoder 71 is connected not to the spline nut driving motor 67 but to the ball spline nut 63, whereby the number of revolutions of the ball spline nut 64 can be directly detected. Correspondingly, a necessity for the arithmetic in accordance with the reduction ratio in the ball screw nut pulse counter 74 is eliminated. Other constructions are the same as those in the third embodiment. In the thus constructed ball screw apparatus also, the same operation and effect as those in the third embodiment are exhibited. There is, however, no necessity for effecting a special arithmetic on the counter value in the ball screw nut pulse counter 74 to directly detect the number of revolutions of the ball spline nut 63.

As discussed above, in accordance with the second group of embodiments of the present invention, when rotating the ball screw shaft, only the ball spline nut may be driven to revolve. At this time, the ball screw nut revolves while following up the ball spline nut. Besides, sets of revolution numbers can be synchronized more completely and coincidentally than before by controlling the number of revolutions of the ball screw nut and that of the ball spline nut under the closed loop control. The precision of the rotary motions of the ball screw shaft is thereby improved. With this operation, the driving commands to move (rectilinearly) the ball screw shaft in the axial direction and cause the rotary motions thereof may be imparted to only one nut. Effects are therefore produced, wherein the control-oriented operability is ameliorated, and interfacing with the outside devices is also facilitated as in the case of the sequence control.

Although the illustrative embodiments of the present invention have been described in detail with reference to the accompanying drawings, it is to be understood that the present invention is not limited to those embodiments. Various changes or modifications may be effected by one skilled in the art without departing from the scope or spirit of the invention.

What is claimed is:

1. A ball screw apparatus comprising:
   a driving shaft formed with a ball screw groove and ball spline grooves; and ball screw nut and ball spline nut arranged in side-by-side relationship in the axial direction and thread-attached to said driving shaft, said two nuts being connected to one driving motor to move said driving shaft in the axial direction and rotate said driving shaft about the axial line, wherein said driving motor and said driving shaft are disposed so that the axial line of an output shaft of said motor is parallel with the axial line of said driving shaft, said ball screw nut is connected directly to said output shaft of said driving motor, said ball spline nut is connected to a rotation transmitting shaft connected via a clutch and a brake to said output shaft of said driving motor, a reduction ratio prescribed from said output shaft of said motor to said ball screw nut is set equal to a reduction ratio prescribed from said output shaft of said motor to said ball spline nut, and a revolving position detector for detecting revolutions of said ball screw nut and said ball spline nut is provided.

2. The ball screw apparatus according to claim 1, wherein said ball screw nut is connected via a first belt to a first pulley fixed to said output shaft, and said ball spline nut is connected via a second belt to a second pulley fixed to said rotation transmitting shaft.

3. The ball screw apparatus according to claim 2, wherein said revolving position detector is attached to said ball screw nut or said spline nut.

4. The ball screw apparatus according to claim 2, wherein said revolving position detector is attached to said rotation transmitting shaft.

5. In a ball screw apparatus including:
a ball screw shaft formed with a ball screw groove and ball spline grooves; and
ball screw nut and ball spline nut attached via balls to said ball screw shaft, said ball screw nut being driven to revolve by a ball screw nut driving means, said ball spline nut being driven to revolve by a ball spline nut driving means, said two driving means being controlled in revolutions by a controller for controlling a predetermined number of revolutions independently, the improvement comprising:
a ball screw nut number-of-revolutions detecting means for detecting the number of revolutions of said ball screw nut;
a ball spline nut number-of-revolutions detecting means for detecting the number of revolutions of said ball spline nut; and
a number-of-revolutions altering means for calculating a difference between sets of revolution numbers inputted from said two number-of-revolutions detecting means and issuing a command to decrement or increment the number of revolutions of said ball screw nut to said ball screw nut driving means so that the difference becomes zero.

* * * * *